United States Patent [19]

Despic

[11] Patent Number: 4,551,399
[45] Date of Patent: Nov. 5, 1985

[54] BIPOLAR BATTERY

[76] Inventor: Aleksandar Despic, Vlajkoviceva 13, 11000 Beograd, Yugoslavia

[21] Appl. No.: 615,917

[22] Filed: May 31, 1984

[30] Foreign Application Priority Data

Jun. 2, 1983 [YU] Yugoslavia .............. 1224/83

[51] Int. Cl.⁴ .................. H01M 4/00; H01M 6/48
[52] U.S. Cl. .................. 429/27; 429/209; 429/210; 429/149
[58] Field of Search .................. 429/27, 209, 210, 149

[56] References Cited

U.S. PATENT DOCUMENTS

| | | | |
|---|---|---|---|
| 3,790,409 | 2/1974 | Fletcher et al. | 429/131 X |
| 3,846,174 | 11/1974 | Barrett | 429/131 |
| 4,100,332 | 7/1978 | Carr | 429/27 |
| 4,257,401 | 8/1980 | Pellegri et al. | 429/210 X |
| 4,389,466 | 6/1983 | Joy | 429/27 |
| 4,400,447 | 8/1983 | Gerenser et al. | 429/27 |
| 4,463,064 | 7/1984 | Ruch et al. | 429/27 |

Primary Examiner—Brian E. Hearn
Assistant Examiner—Stephen J. Kalafut
Attorney, Agent, or Firm—Harlan P. Huebner

[57] ABSTRACT

This invention relates to a bipolar battery with self-perpetuating semi-wedge anodes where electric contact is established between the anode of one cell and the cathode of the adjacent cell through the wall which separates the two cells. The self-perpetuating semi-wedge anodes each have a rectangular triangle as a base, and the self-perpetuation of the wedge is effected by dissolving the anode from one side only, the side where the cathode is placed at the appropriate angle.

4 Claims, 6 Drawing Figures

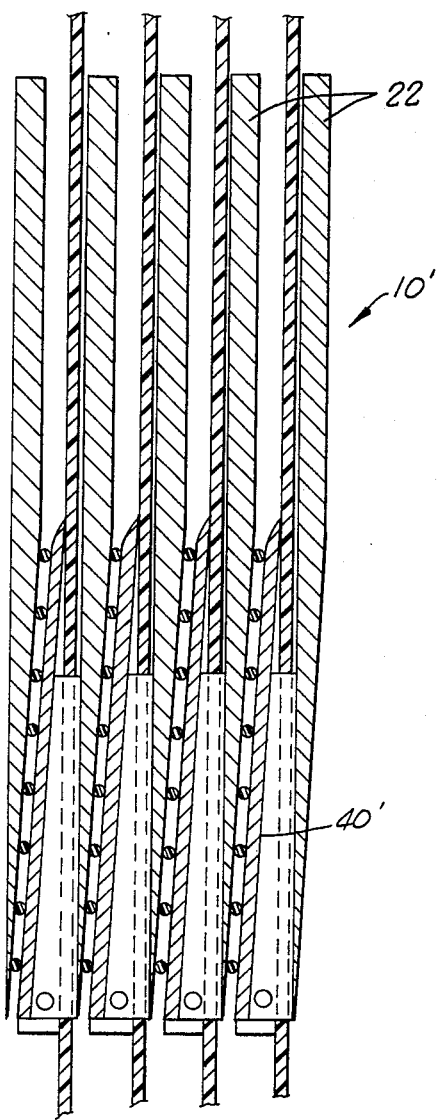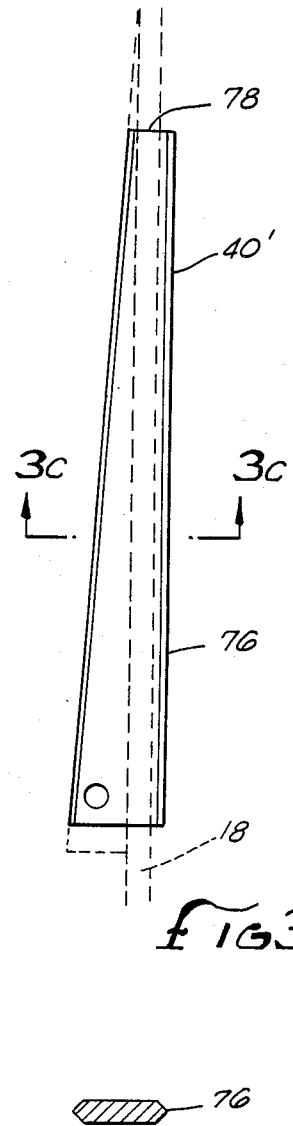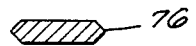
FIG. 3a.
FIG. 3b.
FIG. 3c.

BIPOLAR BATTERY

BACKGROUND OF THE INVENTION

In recent years a development of new types of chemical power sources is under way all over the world. Batteries with mechanical recharge, in which the active mass is replaced upon being consummed are now possible. These types of batteries are either being actively developed or being readied for mass production. They are: aluminum-air, lithium-air and zinc-air batteries. Other metals could also be used as active anodic components (magnesium, iron etc.) Such batteries usually consist of a larger number of cells connected in series for increasing the voltage of the source. In such a case the problem of establishing a good electric contact between the anode of one cell and the cathode of the adjacent cell is encountered. All the current drained from the battery is transmitted from the anode plate of one cell onto the adjacent cathode through this connection.

The larger the plate dimensions and hence the current drain, the larger are also losses occuring in that connection.

In other electrochemical systems (large industrial electrolyzers) this problem is solved by introduction of the so-called bipolar electrodes, i.e. electordes whose one side serves as an anode and the other side as a cathode of the adjacent cell. In this way exeptional simplicity of construction is achieved; there is no need for external connections and the electric resistance is made negligibly small.

This principle has so far not been used in chemical power sources with mechanical recharging. The problem of achieving bipolar electrode construction in this system is more complex than in other systems because the two electrodes have a completely different character. One is being consummed during the operation of the battery, which the other must be continuously supplied with an electochemically active substance (e.g. oxygen from the air). This is the probable reason why the bipolar electrode principle has not yet been applied to these systems.

SUMMARY OF THE INVENTION

In this invention the solution to the problem of the bipolar electrode has been such that the air-cathode has been connected with the consumable anode through the wall against which both electrodes lean and which has good electric conductance. This provides one side of the anode leaning against the wall with contacts connecting it with cathode of the adjacent cell.

On the other hand, considering that the air-cathode must remain at a certain angle with respect to the vertical axis and be provided with a flow of air, the connection between the cathode and the wall is made by placing electrically conducting bridges between the wall and the cathode. The bridges may be vertical or horizontal as well as being an integral part of the cathode or made of separate parts.

In the following examples some constructions of metal-air batteries are shown, which are based on the application of the aforesaid invention, although other constructions are possible which could represent variants but not basically different solutions.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 3a is a cross-sectional view of a modified form of the battery of this invention;

FIG. 3b is a side elevational view of the modified cathode element of the present invention; and FIG. 3c is a cross-sectional view of the modified cathode element taken of line 3c—3c of FIG. 3b.

DETAILED DESCRIPTION OF THE PREFERRED EMBODIMENT

Figure 1A:
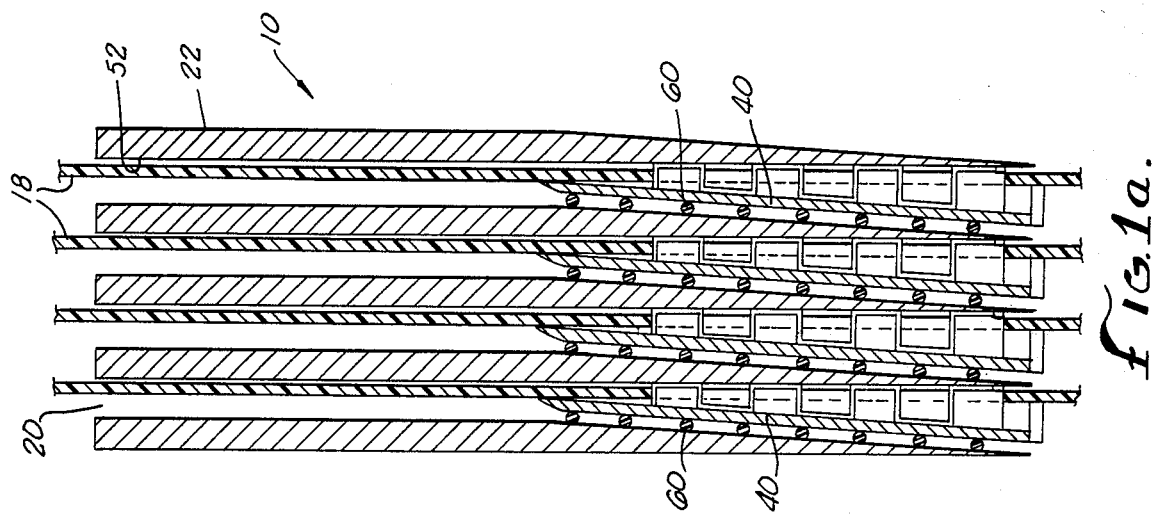
FIG. 1a is a cross-sectional view of battery of this invention.
Figure 2:
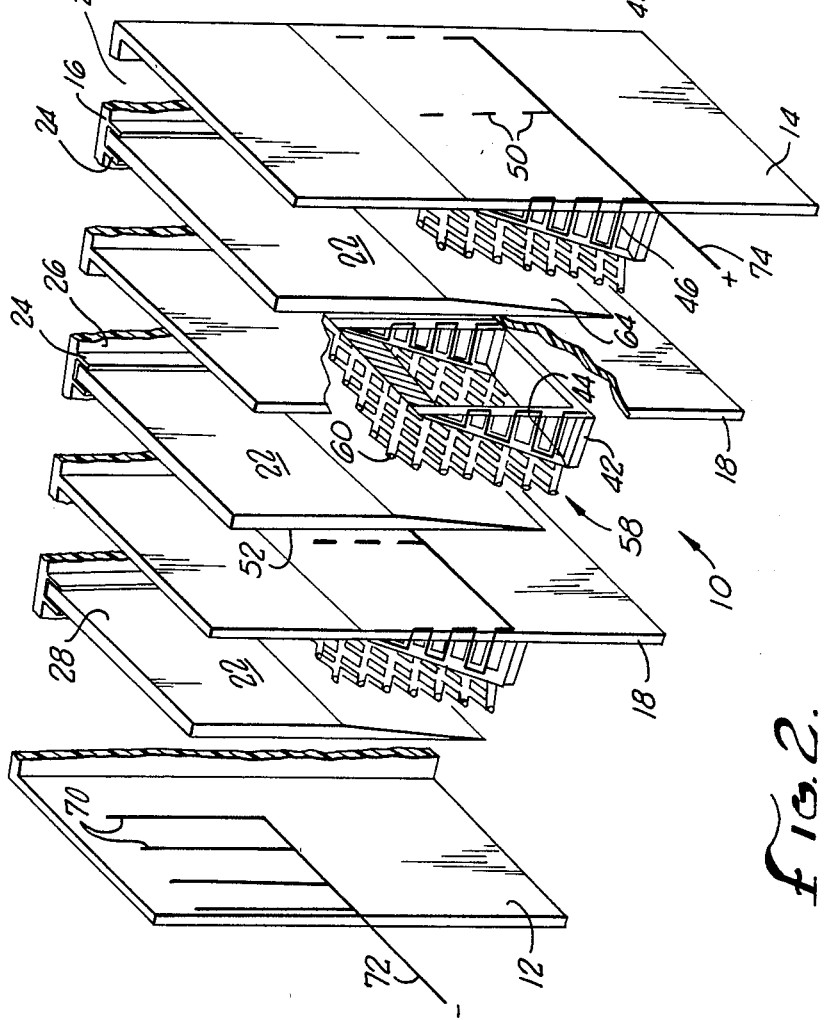
FIG. 2 is an exploded view of the battery of this invention showing the positioning of elements.

In FIGS. 1a and 2 there is illustrated a storage battery generally designated 10. The battery 10 includes a pair of end walls 12 and 14 and side walls 16 (only one of which is shown). In addition there is a bottom wall (not shown) wherein the walls and bottom wall form a battery container. Inserted within the battery container are a plurality of spaced apart cell walls 18. The cell walls are preferably of polyethylene or hard polypropylene.

The spaces 20 formed between the walls are cells and the number of cells may vary depend the voltage required.

In construction, the preferred embodiment of battery 10 in FIGS. 1 through 2 employs anodes 22, one per cell. The anodes 22 are disposable and preferably made of pressed zinc powder and molded to the appropriate shape. In the case of the present invention it is preferable that the anode 22 be of a length to bridge the distance between the side wall 16 and the other side wall. The anodes 22 are adapted to slide from the top in guide extensions 24 which extend inwardly from the interior surface 26 of the wall 16.

The anode 22 are generally rectangular in shape with an upper section 28 of a common thickness approximately half way down the anode it commences to taper to a point forming a wedge.

A cathode generally designated 40 or air-electrode is also positioned, one per cell. The cathode 40 is generally composed of active carbon bonded by polyethylene and made hydrophobic by a plastic emulsion, such as Teflon.

Figure 1B:
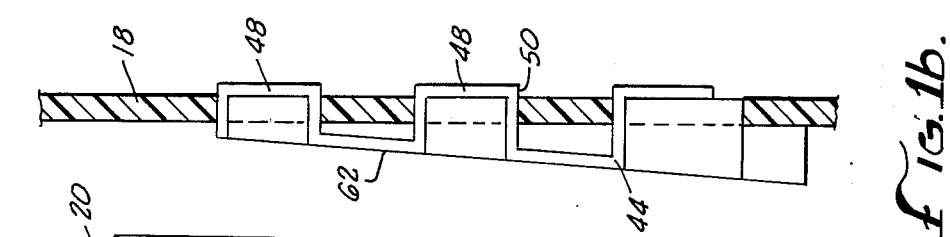
FIG. 1b is a partial cross-sectional view of the cathode element of the present invention in position against a wall of the battery.

The cathode 40, preferrably wedge shaped in elevation, see FIG. 1b, is formed of plastic and includes a base portion 42 and end zig zag contact means 44.

A metal contact wire 46 is pressed into the zig zag arms 48. Each cell wall 18 includes a plurality of slots 50 through which the arms 48 project into the next adjacent cell.

The arms 48 inturn bear against the back side 52 of the anode 22.

In addition between the base 42 and the first arm 48 there is space as between the various other portions of the cathode 40 to allow air to circulate and act as an oxidant.

The distance between the anode 22 and the cathode 40 in one cell is maintained by a spacer means 58 which is a mesh net 60 which extends across the inside of each cell. The mesh net 60 is preferrably made of polyethylene.

In operation the cathode 40 is inserted in a cell and the arms 48 are pushed through slots 50 butting against an anode 22 in the adjoining cell. The spacer means 58 is next inserted and bears against the tapered back side 62 of the cathode. Next the anode 22 may be inserted in the guide extensions 24 with the wedge side toward the cathode in the same cell. As the anode is lowered the wedge surface 64 engages the spacer means 58 pushing all the elements against the cell wall 18 to assure a tight fit and complete contact.

In the case of the end wall butting against the anode 28 there are contact wires 70 which terminate in a negative lead 72.

At the other end wall 14 there is a positive lead 74 which is in contact with the metal contact wires 46 of the arms 48.

The modification, FIGS. 3a, 3b and 3c is directed to an aluminum-air battery with neutral saline electrolyte. The anodes 22 are shown in position and preferable wedge shaped and made of aluminum alloyed with 0.2% gallium.

The cathode 40' differs from the former in that the contact surface 76 is pointed and is uninterrupted and extends through an elongated slot 78 in the wall 18.

There is also provided the spacer means 58 as in the preferred embodiment. In operation the battery 10 will act in the same way as the preferred embodiment.

The invention and its attendant advantages will be understood from the foregoing description and it will be apparent that various changes may be made in the form, construction and arrangement of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A bipolar storage battery employing a number of cells between a pair of parallel end walls and a pair of parallel side walls normal to the plane of said end walls, each of said cells formed between opposed cells walls each having a first and second face, said battery including:
   a removable-replaceable anode including a wall contacting side and cell facing side, said wall contacting side being coplanar and abutting the first face of said one wall, said cell facing side having an upper portion generally parallel with said wall contacting side and a lower tapered portion angled inwardly and downwardly forming a wedge;
   a cathode member contacting the second face of said other wall, said member including projections and spaces for air to act as an oxidant, and a face opposite said projections angularly disposed thereto toward said tapered portion and generally parallel with said lower tapered portions of said anode;
   each of said side walls including slots therethrough complimentary with the projections of said cathode member and receiving said projections, said projections extending through said wall into an adjacent cell and bearing against said wall contacting side of said anode;
   said wedge portion of said anode gravitationally biasing said cathode against said wall;
   spacer means separating said anode and said cathode member in the same cell;
   contact means interconnecting said anodes and passing to the exterior of said bettery forming one contact; and
   contact means interconnecting said cathodes and passing to the exterior of said battery forming another contact.

2. A bipolar storage battery as defined in claim 1 wherein said opposed side walls have groove means to guide and hold said anodes when inserted in said battery.

3. A bipolar storage battery as defined in claim 1 wherein the projections are a series of contacts vertically aligned one above the other.

4. A bipolar storage battery as defined in claim 1 wherein the projection of each of said cathodes is a continuous elongated knife contact adapted to bear against the anode.

* * * * *